3,801,610
PREPARATION OF CARBOXYLIC ACID AMIDES
Achim Werdehausen, Monheim, and Herbert Weiss, Cologne-Deutz, Germany, assignors to Henkel & Cie., G.m.b.H., Dusseldorf, Germany
No Drawing. Filed May 24, 1971, Ser. No. 146,564
Claims priority, application Germany, Mar. 3, 1971, P 21 10 060.7
Int. Cl. C07c 103/30
U.S. Cl. 260—404
8 Claims

ABSTRACT OF THE DISCLOSURE

A method for the production of N-substituted amides of fatty acids of 8 to 24 carbon atoms by reacting the free carboxylic acids or their esters with amines in the presence of catalysts consisting of compounds of metals of the Group IVb and Vb of the Periodic Table which are soluble in the reaction mixture.

OBJECTS OF THE INVENTION

It is an object of the invention to provide a novel process for the production of N-substituted amides of higher fatty acids in good yields and in reduced reaction time.

It is a further object of the invention to provide an improved process for the reaction of amines and higher fatty acids in the presence of catalysts of metals of Groups IVb and Vb of the Periodic Table.

These and other objects and advantages of the invention will become obvious from the following detailed description.

THE INVENTION

The novel process of the invention for the preparation of N-substituted amides of fatty acids comprises reacting a primary or secondary amine with a member of the group consisting of aliphatic carboxylic acids of 8 to 24 carbon atoms and esters thereof with aliphatic alcohols in the presence of a reaction-soluble, catalyst compound of a metal of Groups IVb and Vb of the Periodic Table. The process of the invention has the advantage of reduced reaction time as compared to known processes, and a high quality product practically free of by-products or unreacted starting material, and having excellent color quality.

Among the compounds of the metals that are suitable as catalysts are soluble metal compounds formed in the reaction mixture from finely dispersed metal, for example, ground tin; (a) the esters of the corresponding ortho-acids particularly with primary and secondary aliphatic alcohols which contain preferably 1–18 carbon atoms, e.g. methanol, ethanol, n- and iso-propanol, n- and iso-butanol, 2-ethyl-hexanol-1, lauryl alcohol, stearyl alcohol, synthetic alcohol mixtures from oxo and Ziegler processes and ether and polyether alcohols, as they can be produced by alkoxylation reactions of substances with active H-atoms; (b) complex compounds with 1,3-diketones, such as 3 - methylpentanedione - (2,4),3-ethylpentanedione-(2,4), heptanedion-(2,4), decanedion-(2,4) and particularly pentanedione-(2,4) (acetyl acetone); (c) halogen compounds of the metals in their highest valence stage, particularly chlorine compounds; and (d) acyl compounds as they can be produced by reacting the halides with metal salts of carboxylic acids in known manner, for example, by the method of U.S. Pats. 2,132,999, 2,489,651 and 2,621,195, and which are partly present in polymeric form containing groups similar to the gels formed by intermolecular dehydration from the orthometallic acids. Such compounds are generally called metal-polyhydroxy acylates.

The preferred metal compounds are the titanium-, zirconium-, and tantalum compounds of the above mentioned type, for example, tetra-isopropyl titanate, tetra-n-butyl titanate, tetra-isopropyl zirconate, tetra-n-butyl zirconate, tetra-isobutyl-zirconate, tetra - 2 - ethyl-hexyl-titanate, tetra-stearyl titanate, mixed esters of titanic acid with short- and long-chained alcohols, e.g. $C_3$- and $C_{18}$-alcohols, titanium-polyhydroxy acylates of the formula:

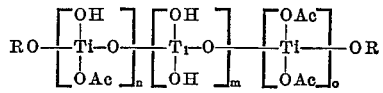

wherein R is hydrogen or acyl of an organic carboxylic acid and at least one of $m$, $n$ and $o$ is an integral number, and the others may be zero or an integral number, and Ac is acyl of an organic carboxylic acid, preferably stearoyl, tetra-n-propyl zirconate, tetra-isobutyl zirconate, tetra-n-butyl zirconate, titanium acetyl acetonate, zirconium acetyl acetonate, titanium tetrachloride, zirconium tetrachloride, tantalum pentachloride. Of the above described catalysts, the complex compounds of the 1,3-diketones, primarily of acetyl acetone, are particularly advantageous because of their resistance to hydrolysis.

The catalysts are added to the reaction mixture in quantities of 0.1 to 10, preferably 0.5 to 5% by weight, related to the carboxylic acid or carboxylic ester to be reacted.

The reaction can be carried out with primary and secondary aliphatic cycloaliphatic or mixed aliphatic/cycloaliphatic amines such as: (a) primary and secondary aliphatic amines with 1 to 24 C-atoms in the alkyl radicals, like methylamine, dimethylamine, mono- and diethylamine, mono- and diethanolamine, methyl-dodecyl amine, didodecyl amine, octadecyl amine, methyl octadecyl amine, erucyl amine, behenyl amine, as well as fatty amine mixtures, as can be obtained in known manner, for example, from natural fatty acid mixtures; (b) cyclo--aliphatic and mixed aliphatic/cycloaliphatic amines, like cyclohexyl amine, methyl cyclohexyl amine; (c) aliphatic and/or cycloaliphatic di- and polyamines or polyalkylene polyamines, like ethylene diamine, hexamethylene diamine, heptamethylene diamine, octamethylene diamine, propylene diamine, diethylene triamine, triethylene tetramine, tetraethylene-pentamine, di- and tri-amino-cyclohexanes.

In the method according to the invention, the aliphatic carboxylic acids to be reacted may be straight-chained and branched saturated and unsaturated aliphatic carboxylic acids with 8 to 22 carbon atoms as well as corresponding hydroxy-carboxylic acids, for example, lauric acid, myritic acid, palmitic acid, stearic acid, arachic acid, ricinoleic acid, hydroxystearic acids from the hydroxylation of oleic acid, behenic acid, lignoceric acid, oleic acid, erucic acid, linoleic acid, linolenic acid, arachidonic acid, ricinoleic acid, ricinenic acid, capric acid, caprylic acid, straight-chained and branched chain carboxylic acid of synthetic origin, for example, the carboxylic acids obtained by oxidation or paraffins in the presence of boric acid or by oxo-reduction, cyclic carboxylic acids like naphthenic acid, resinic acids or polymeric carboxylic acids obtained by polymerization of unsaturated carboxylic acids. These carboxylic acids can be used individually or in mixture with each other as starting materials. Carboxylic acids which are suitable as starting materials can be produced in known manner by saponification of natural triglyceride mixtures, for example, coconut oil, cottonseed oil, linseed oil, olive oil, palm oil, palm kernel oil, soy bean oil, tall oil, lard, beef tallow, fish oil and castor oil.

As starting materials which can also be reacted in the method are the esters of the above-mentioned carboxylic acids with monovalent aliphatic alcohols. Preferred are the esters of alcohols with 1 to 4 carbon atoms, since these esters, particularly the methyl esters, are commercially available as re-esterification mixtures of natural triglyceride mixtures. If such esters or their homolog mixtures are used, there can be an additional N-alkylation by further reaction of the first formed carboxylic amides with the alcohol released during the reaction.

The reaction between amines and aliphatic carboxylic acids or their esters is carried out preferably in a temperature range of 100 to 300° C. A higher temperature than 300° C. enhances a faster reaction while a lower than the indicated temperature still permits a reaction, but it requires unjustifiably long reaction times. Of particular advantage is a temperature range of 120 to 200° C.

When amines are used which volatilize easily at the respective reaction temperatures, they are advantageously recycled whereby they simultaneously serve as an entrainer for the water formed during the reaction, and they are liberated of the entrained water by installing cooling traps in the gas cycle. The introduction of the amines volatilizing easily at the respective reaction temperature can be effected best at the bottom of the reaction vessel, particularly if they are preheated, which is advisable particularly for larger charges, so that a very long contact of the amine with the carboxylic acid or carboxylic acid esters to be reacted is ensured. Suitable reaction vessels are particularly vertical reaction towers or tubes whose dimensions must be adapted to the available equipment and to the size of the charges. As reaction vessels, reactors with other dimensions can also be used provided a sufficiently fine dispersion of the supplied gas supply in the reaction mixture is ensured by a corresponding constructional design of the amine gas supply, for example, an intensive stirrer in front of the feed pipe.

The gaseous amine is introduced into the reaction mixture, preferably in an amount which should not be less than 20 liters/kg. of carboxylic acid or carboxylic acid ester an hour. The optimum amount and velocity of flow are determined to a great extent by the available equipment and can also be adapted to the reaction course. For example, at the start of the reaction, relatively large amounts and high velocities of flow were used and are slowly reduced with decreasing amine consumption of the reaction mixture.

In the reaction of higher or high-boiling amines, such as coconut- or tallow amine, it is possible to work in simple stirring vessels with the necessary auxiliary devices, like a nitrogen atmosphere, condenser and water separator. This reaction in the liquid phase can be carried out principally in equivalent quantitative ratios. Because of the water vapor volatility of the amines used, which can be discharged with the water formed during the reaction, the amines must be used in a molar excess of 5 to 10% relative to the carboxylic acid or carboxylic acid ester used. The use of an entrainer for the water formed in the reaction is not absolutely necessary in the invention. This is of particular importance in the reaction of high-boiling amines in the liquid phase where such a measure would mean an additional expenditure. Both with the use of highly volatile and of high-boiling amines, the reaction can be carried out under normal pressure.

The end products can be used in many ways, for example, as detergent ingredients, crystallization aids or as solvents for inorganic and organic substances, such as polymers. They represent furthermore valuable intermediate products, for example, for the production of surface-active substances and textile aids. The products derived from di- and polyamines or polyalkylene-polyamines are suitable as washing and plastic aids, for example, as lubricants and anti-blocking agents.

In the following examples there are described several preferred embodiments to illustrate the invention. However, it should be understood that the invention is not intended to be limited to the specific embodiments.

The percentages of free acid and free amines indicated in the following examples were determined by titration with bases against phenolphthalein or by titration with acids against bromophenol blue. The Lovibond color values were measured in solutions (1 part by weight carboxylic amide in 5 parts by weight chloroform) using a 1" cuvette at 40° C., the Gardner color values in the melt with a Lovibond-3-comparator.

EXAMPLE 1

500 g. of a commercial fatty acid fraction consisting substantially of oleic acid (<C-12 0.3%, C-12 0.9%, C-14 0.6%, C-16 4.2%, C-18 1.9, C-18 I 79.2%, C-18 II 8.4% and >C-18 1.3%, C-20 1.3%, >C-20 1.9%; acid number 196.3; saponification number 197.2, iodine number 91.2, turbidity point 8° C.) were charged into a round bottom flask provided with a stirrer and mixed with 5 g. (=1% by weight) of tetrapropyl zirconate. After heating the mixture to 195° C. dimethylamine, which was preheated to 100° C., was introduced into the reaction mixture with intensive stirring at a rate of flow of 95 l./h. After two hours, the rate of flow of dimethylamine was reduced to 45 l./h. The product, after a total reaction time of 5 hours, contained 98.5% of the dimethyl amide, 1.37% of free unreacted acid and 0.11% of free amine. The Lovibond color values of the product were yellow 5.0 and red 0.8.

EXAMPLES 2–4

The carboxylic acid used in Example 1 was reacted with dimethylamine under similar conditions by varying the reaction temperature and the results are in Table I.

TABLE I

| Example No. | Reaction | | Acid number | Percent | | | Lovibond color values | |
|---|---|---|---|---|---|---|---|---|
| | Temperature (° C.) | Time (hours) | | Free acid | Free amine | Amide | Yellow | Red |
| 2 | 150 | 12 | 4.3 | 2.11 | 0.18 | 97.7 | 7.1 | 1.2 |
| 3 | 165 | 7.5 | 2.83 | 1.39 | 0.10 | 98.5 | 4.9 | 1.0 |
| 4 | 180 | 6 | 2.31 | 1.13 | 0.10 | 98.8 | 2.9 | 0.6 |

EXAMPLES 5–7

The carboxylic acid used in Example 1 was reacted in the presence of 1% by weight of the catalysts mentioned in the following table at 195° C. with dimethylamine in a procedure similar to that in Example 1. The results are shown in Table II.

TABLE II

| Ex. No. | Catalyst | Reaction time (hours) | Acid number | Percent | | | Lovibond color values | |
|---|---|---|---|---|---|---|---|---|
| | | | | Free acid | Free amine | Amide | Yellow | Red |
| 5 | Titanium acetyl acetonate | 5 | 1.02 | 0.51 | 0.10 | 99.4 | 3.0 | 0.5 |
| 6 | Titanium polyhydroxy stearate [1] | 6 | 1.20 | 0.59 | 0.19 | 99.2 | 6.0 | 1.1 |
| 7 | Tetraisopropyl titanate | 5 | 0.91 | 0.45 | 0.15 | 99.4 | 3.2 | 0.7 |

[1] Acyl compound with Ac=stearoyl.

EXAMPLES 8–12

The carboxylic acids in the following table were reacted in the presence of 1% by weight of tetrapropyl zirconate at 195° C. with dimethylamine in a procedure similar to Example 1. The results are in Table III.

TABLE III

| Ex. No. | Carboxylic acid | Reaction time (hours) | Acid number | Percent Free acid | Percent Free amine | Amide | Lovibond color Yellow | Lovibond color Red |
|---|---|---|---|---|---|---|---|---|
| 8 | Lauric acid | 6 | 1.87 | 0.64 | 0.0 | 99.4 | 1.1 | 0.1 |
| 9 | Myristic acid | 6 | 1.46 | 0.59 | 0.0 | 99.4 | 2.0 | 0.1 |
| 10 | Palmitic acid | 5 | 1.05 | 0.49 | 0.0 | 99.5 | 2.1 | 0.0 |
| 11 | Erucic acid [1] | 5 | 3.55 | 1.66 | 0.2 | 98.1 | 1.0 | 0.1 |
| 12 | Fatty acid mixture $C_8/C_{10}$ [2] | 7 | 3.11 | 1.42 | 0.0 | 98.9 | 5.1 | 0.1 |

[1] 95%.
[2] Composition: $C_8$=41.0%, $C_{10}$=59.0%.

EXAMPLES 13–14

The commercial oleic acid used in Example 1 and a technical stearic acid of the composition (C–12 1.1%, C–14 2.6%, C–16 45.3%, C–18 51.0%, acid number 209.2, saponification number 210.0, iodine number 0.5, titer 55.8° C.) were reacted with methyl amine in the presence of 1% by weight of tetrapropyl zirconate at the respective reaction temperatures in a procedure similar to Example 1. The results are shown in Table IV.

TABLE IV

| Ex. No. | Carboxylic acid | Reaction temp. (° C.) | Acid number | Percent Free acid | Percent Free Amine | Amide | Lovibond color value Yellow | Lovibond color value Red |
|---|---|---|---|---|---|---|---|---|
| 13 | Oleic acid | 195 | 1.12 | 0.55 | 0.15 | 99.3 | 1.4 | 0.0 |
| 14 | Stearic acid | 170 | 1.60 | 0.79 | 0.10 | 99.1 | 1.9 | 0.1 |

Comparison tests

The reaction of the oleic acid described in Example 1 and of a technical stearic acid according to Example 14 was repeated with dimethyl amine and methylamine without a catalyst, and in the presence of the compounds boric acid and alumina known as catalysts for the reaction of carboxylic acids with ammonia. The latter catalyst was used in amounts of 1% by weight relative to the carboxylic acid to be reacted. The procedure was similar to that in Example 1. Table V shows that considerably longer reaction times are required to achieve comparable degrees of reaction and that the color quality drops considerably compared to the examples of the invention.

TABLE V

| Carboxylic acid | Amine | Catalyst | Reaction Temp. (° C.) | Reaction Time (hours) | Acid No. | Percent Free acid | Percent Free Amine | Amide | Lovibond color Yellow | Lovibond color Red |
|---|---|---|---|---|---|---|---|---|---|---|
| Oleic acid [1] | $(CH_3)_2NH$ | | 195 | 14 | 4.88 | 3.41 | 0.0 | 96.6 | 42.0 | 6.3 |
| Do | $(CH_3)_2NH$ | $H_3BO_3$ | 195 | 9 | 1.09 | 2.23 | 0.14 | 98.8 | 11.0 | 0.9 |
| Do | $(CH_3)_2NH$ | $Al_2O_3$ | 195 | 10 | 2.43 | 1.19 | 1.53 | 97.3 | 14.0 | 3.2 |
| Do | $CH_3NH_2$ | | 195 | 15 | 0.95 | 0.59 | 0.10 | 99.3 | 12.2 | 0.8 |
| Stearic acid [2] | $(CH_3)_2NH$ | | 195 | 13 | 3.78 | 1.84 | 0.0 | 98.2 | 17.2 | 3.0 |
| Do | $CH_3NH_2$ | | 170 | 12 | 3.49 | 1.72 | 0.20 | 98.1 | 14.0 | 1.0 |

[1] Composition as in Example 1.
[2] Composition as in Example 14.

EXAMPLES 15–17

60 kg. each of a substantially equimolar mixture (molar ratio carboxylic acid: amine—1:1.05) of the oleic acid described in Example 1 and of a primary coconut amine (composition—C–8 5.5%, C–10 6.4%, C–12 47.1%, C–14 18.2%, C–16 10.0%, C–18 12.8%) were heated to 165° C. in a vessel provided with a stirrer, condenser and water separator under a nitrogen atmosphere in the presence of 1% by weight of the catalysts indicated below and kept during the indicated period at this temperature. The reactions carried out without a catalyst and in the presence of boric acid and alumina as catalysts required much longer reaction times for a comparable degree of reaction and yielded products of poorer color quality. The results are in Table VI.

TABLE VI

| | Catalyst | Reaction Temp. (° C.) | Reaction Time (hours) | Acid No. | Percent Free acid | Percent Free amine | Amide | Lovibond color value Yellow | Lovibond color value Red |
|---|---|---|---|---|---|---|---|---|---|
| Example No.: | | | | | | | | | |
| 15 | Tetrapropyl zirconate | 165 | 4 | 3.37 | 1.65 | 0.0 | 98.4 | 4.9 | 0.1 |
| 16 | Titanium acetyl acetonate | 165 | 5 | 2.50 | 1.23 | 0.41 | 98.4 | 5.1 | 0.3 |
| 17 | Titanium polyhydroxy stearate [1] | 165 | 5 | 1.88 | 0.92 | 1.46 | 97.6 | 6.3 | 0.1 |
| Comparison | | 165 | 11 | 7.85 | 3.84 | 4.38 | 91.8 | 14.2 | 2.0 |
| Do | $H_3BO_3$ | 165 | 10 | 1.53 | 0.75 | 1.88 | 97.4 | 20.0 | 4.2 |
| Do | $Al_2O_3$ | 165 | 9 | 3.15 | 1.54 | 1.10 | 97.4 | 23.1 | 3.4 |

[1] Acyl compound with Ac=stearoyl.

EXAMPLES 18–24

In a similar manner, the fatty acid mixtures mentioned below were reacted in the presence of 1% by weight of tetrapropyl zirconate at 165° C. with the above-described coconut amine. The results are reported in Table VII.

TABLE VII

| Example No. | Carboxylic acid | Reaction time (hours) | Acid No. | Percent Free acid | Percent Free amine | Amide | Lovibond color Yellow | Lovibond color Red |
|---|---|---|---|---|---|---|---|---|
| 18 | Soya fatty acid | 6 | 1.58 | 0.78 | 1.22 | 98.0 | 2.7 | 0.1 |
| 19 | Rape oil acid | 6 | 1.36 | 0.76 | 1.02 | 98.2 | 3.0 | 0.1 |
| 20 | Sperm oil acid | 5 | 3.59 | 1.71 | 0.39 | 97.9 | 0.8 | 0.1 |
| 21 | Trane oil acid | 5 | 2.98 | 1.48 | 0.82 | 97.7 | 1.5 | 0.2 |
| 22 | Tallow fatty acid | 5 | 2.78 | 1.37 | 0.60 | 98.0 | 1.2 | 0.1 |
| 23 | Fatty acid mixture $C_8/C_{10}$ [1] | 4 | 0.86 | 0.24 | 1.34 | 98.4 | 0.8 | 0.1 |
| 24 | Erucic acid 95% [2] | 3 | 2.37 | 1.36 | 0.57 | 98.1 | 2.0 | 0.1 |

[1] Composition: $C_8$=41.0%, $C_{10}$=59.0%.
[2] Balance: $C_{20}$=0.5%, $C_{20}$=I 2.0%, $C_{22}$=1.9%.

EXAMPLES 25–31

The Examples 18 to 24 were repeated with the exception that a tallow amine (composition C–14 6.5% C–16 31.4%, C–18 62.1%) was used instead of coconut amine and that the reaction temperature was kept at 195° C. The results are in Table VIII.

TABLE VIII

| Example No. | Carboxylic acid | Reaction time (hours) | Acid No. | Percent Free acid | Percent Free amine | Amide | Lovibond Color Yellow | Lovibond Color Red |
|---|---|---|---|---|---|---|---|---|
| 25 | Soya fatty acid | 5 | 1.54 | 0.76 | 1.0 | 98.2 | 1.8 | 0.0 |
| 26 | Rape oil acid | 5 | 2.44 | 1.36 | 0.0 | 98.7 | 3.1 | 0.2 |
| 27 | Sperm oil acid | 5 | 1.62 | 0.74 | 0.76 | 98.8 | 3.6 | 0.1 |
| 28 | Trane oil acid | 4 | 3.14 | 1.44 | 0.16 | 98.4 | 5.0 | 0.3 |
| 29 | Tallow fatty acid | 4 | 1.22 | 0.60 | 1.18 | 98.2 | 5.0 | 0.2 |
| 30 | Fatty acid mixture $C_8/C_{10}$ [1] | 5 | 1.24 | 0.34 | 1.38 | 98.3 | 1.1 | 0.2 |
| 31 | Erucic acid 95% [2] | 5 | 1.62 | 0.74 | 0.56 | 98.8 | 3.6 | 0.1 |

[1] Composition as in Example 23.
[2] Composition as in Example 24.

EXAMPLES 32–35

In a test similar to Example 15, palmitic acid of commercial quality (composition: C–14 1.0%, C–16 98.0%, C–17 1.0%) was reacted with ethylene diamine in the presence of 1% relative to carboxylic acid of the catalysts mentioned below at 165° C. The reaction took place in a molar ratio of carboxylic acid: alkylene diamine= 2:1.10 and 2.5 kg. of the respective mixture was used in each case.

TABLE IX

| Example No. | Catalyst | Reaction time (hours) | Acid No. | Percent Free acid | Percent Free amine | Amide | Gardner color value |
|---|---|---|---|---|---|---|---|
| 32 | Tetrapropyl zirconate | 5 | 2.92 | 1.44 | 0.61 | 98.0 | 4–5 |
| 33 | Tetrapropyl tetra isopropyl titanate | 5 | 1.24 | 0.76 | 0.92 | 98.3 | 5–6 |
| 34 | Titanium acyl acetonate | 4 | 0.42 | 0.23 | 0.78 | 99.0 | 4–5 |
| 35 | Titanium polyhydroxy stearate [1] | 4 | 2.19 | 1.36 | 1.20 | 97.4 | 5–6 |

[1] Acyl compound with Ac=stearoyl.

EXAMPLES 36–50

In the same quantitative ratios and with the same procedure as in Example 32, the reaction was carried out between the carboxylic acids and alkylene diamines mentioned below in the presence of 1% by weight of tetra-propyl zirconate.

TABLE X

| Example No. | Carboxylic acid | Reaction Temp. (° C.) | Reaction Time (hours) | Acid No. | Percent Free acid | Percent Free amine | Amide | Gardner color value |
|---|---|---|---|---|---|---|---|---|
| (a) Ethylene diamine: | | | | | | | | |
| 36 | Stearic acid, technical [1] | 165 | 4 | 1.38 | 0.67 | 0.68 | 98.7 | 3–4 |
| 37 | do | 195 | 3 | 1.29 | 0.64 | 0.74 | 98.6 | 6–7 |
| 38 | Lauric acid | 165 | 5 | 0.50 | 0.19 | 0.87 | 98.9 | 4–5 |
| 39 | Myristic acid | 165 | 4 | 2.11 | 1.05 | 0.10 | 98.9 | 3–4 |
| 40 | Erucic acid 95% | 165 | 4 | 2.45 | 1.42 | 0.98 | 97.6 | 4–5 |
| (b) Propylene diamine: | | | | | | | | |
| 41 | Stearic acid, technical [1] | 165 | 6 | 4.31 | 214 | 1.45 | 96.4 | 4–5 |
| 42 | do | 195 | 5 | 2.12 | 1.17 | 0.86 | 98.0 | 5–6 |
| 43 | Palmitic acid | 165 | 6 | 3.23 | 1.48 | 0.56 | 98.0 | 3–4 |
| 44 | do | 195 | 6 | 1.05 | 0.76 | 0.88 | 98.4 | 6–7 |
| 45 | Erucic acid | 165 | 7 | 4.13 | 2.40 | 1.58 | 96.0 | 5–6 |
| (c) Hexamethylene diamine: | | | | | | | | |
| 46 | Stearic acid, technical [1] | 165 | 4.5 | 1.91 | 0.91 | 0.04 | 99.0 | 2–3 |
| 47 | do | 195 | 2.5 | 1.81 | 0.89 | 1.03 | 98.1 | 3–4 |
| 48 | Myristic acid | 165 | 5.5 | 2.90 | 1.44 | 0.36 | 98.2 | 5 |
| 49 | Palmitic acid | 165 | 5 | 0.62 | 0.28 | 0.35 | 99.4 | 4–5 |
| 50 | Erucic acid | 165 | 4.2 | 1.32 | 0.65 | 0.43 | 99.0 | 4–5 |

[1] Composition: $C_{12}$=1.1%, $C_{14}$=2.6%, $C_{16}$=45.3%, $C_{18}$=51.0%; acid number 209.2, saponification number = 210.0, iodine number 0.5.

Comparative tests of the reaction of technical stearic acid with hexamethylene diamine without catalysts showed that a comparable degree of reaction could only be achieved by tripling the reaction time while the color of the products deteriorated.

EXAMPLES 51 AND 52

In the procedure according to Examples 1 and 15 to 17, commercial oleic acid (see Example 1) was reacted with dimethyl amine and with primary coconut amine resp. described in Examples 15 to 17 in the presence of 1% by weight of ground tin.

TABLE XI

| Example No. | Amine | Reaction time hours | Acid No. | Percent | | | Lovibond color | |
|---|---|---|---|---|---|---|---|---|
| | | | | Free acid | Free amine | Amide | Yellow | Red |
| 51 | (CH₃)₂NH | 6 | 2.20 | 1.06 | 0.13 | 98.8 | 4.7 | 0.9 |
| 52 | Coconut amine | 4 | 1.96 | 0.96 | 0.94 | 98.1 | 3.1 | 2.0 |

EXAMPLE 53

Using the procedure of Examples 15 to 17, 9-hydroxystearic acid was reacted with the above-described primary coconut amine in a molar ratio of 1:1.05 in the presence of 1% by weight of tetrapropyl zirconate at 195° C. to obtain a product which contained 83% amide and 12% ester as well as 2.6% free acid.

The advantages achieved with the invention consists primarily in that substituted carboxylic amides are made accessible by reacting carboxylic acids with amines in an economical method with a high degree of purity. Particularly noteworthy is the relatively short reaction time which is necessary for a complete reaction and the excellent color quality of the products. Important also is that an excess of amines, which could lead to a higher expenditure in the processing of the products, is not required.

Various modifications of the process of the invention may be made without departing from the spirit or scope thereof, and it is to be understood that the invention is not intended to be limited only as defined in the appended claims.

We claim:

1. A process for the preparation of N-substituted amides of aliphatic carboxylic acids comprising reacting a primary or secondary amine with a member of the group consisting of aliphatic carboxylic acids of 8 to 24 carbon atoms and esters thereof with aliphatic alcohols in the presence of a reaction-soluble catalyst compound of a metal selected from the group consisting of a tantalum halide or a zirconium or titanium compound selected from the group consisting of ortho acid esters with alcohols, complexes with 1,3- diketones, halogen compounds and acyl compounds.

2. The process of claim 1 wherein the catalyst used is 0.1 to 10% by weight based on the carboxylic acid compound.

3. The process of claim 2 wherein the amount of catalyst is 0.5 to 5%.

4. The process of claim 1 wherein the reaction is effected at 100 to 300° C.

5. The process of claim 3 wherein the reaction is effected at 120 to 200° C.

6. The process of claim 1 wherein the amine is a higher boiling amine and is used in a 5 to 10% molar excess with respect to the acid compound.

7. The process of claim 1 wherein the reaction is effected at atmospheric pressure.

8. A process for the preparation of N-substituted carboxylic acid amides comprising reacting at 100 to 200° C. a primary or secondary amine with a member of the group consisting of a carboxylic acid of 8 to 24 carbon atoms and esters thereof with aliphatic alcohols of 1 to 4 carbon atoms at normal pressures in the presence of 0.1 to 10% by weight based on the said compound, of a metal catalyst compound of a metal selected from the group consisting of a tantalum halide or a zirconium or titanium compound selected from the group consisting of ortho acid esters with an alcohol, halides, complexes with aliphatic 1,3-diketones and polyhydroxy acylates.

References Cited

UNITED STATES PATENTS

| 3,324,179 | 6/1967 | Scholz et al. | 260—561 |
| 3,590,057 | 6/1971 | Suzuki et al. | 260—404 |
| 1,991,956 | 2/1935 | Ralston | 260—404 |
| 2,013,108 | 9/1935 | Reppe et al. | 260—404 |
| 2,794,043 | 5/1957 | Jansen et al. | 260—404 |

LEWIS GOTTS, Primary Examiner

E. G. LOVE, Assistant Examiner

U.S. Cl. X.R.

260—404.5, 557 R, 561 R